Figure 3:
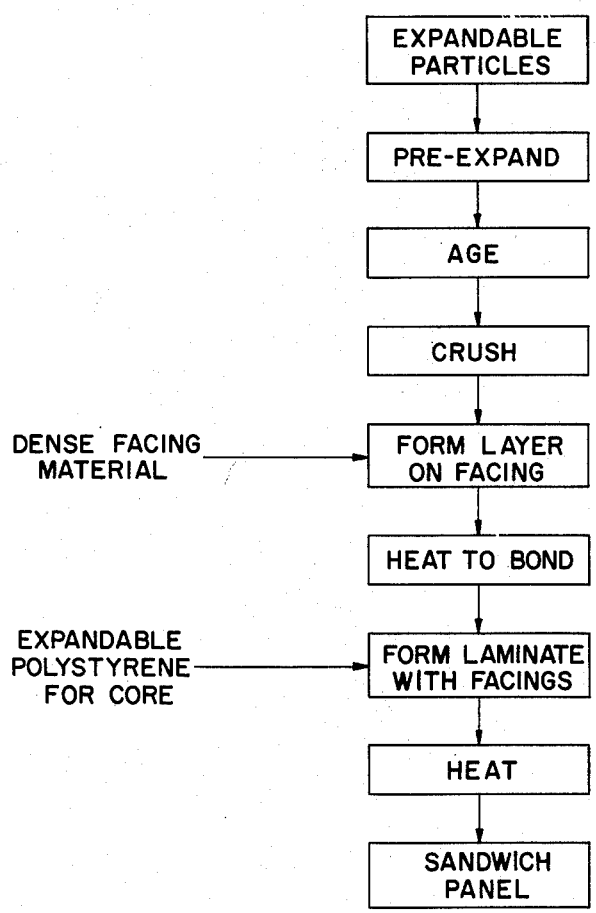

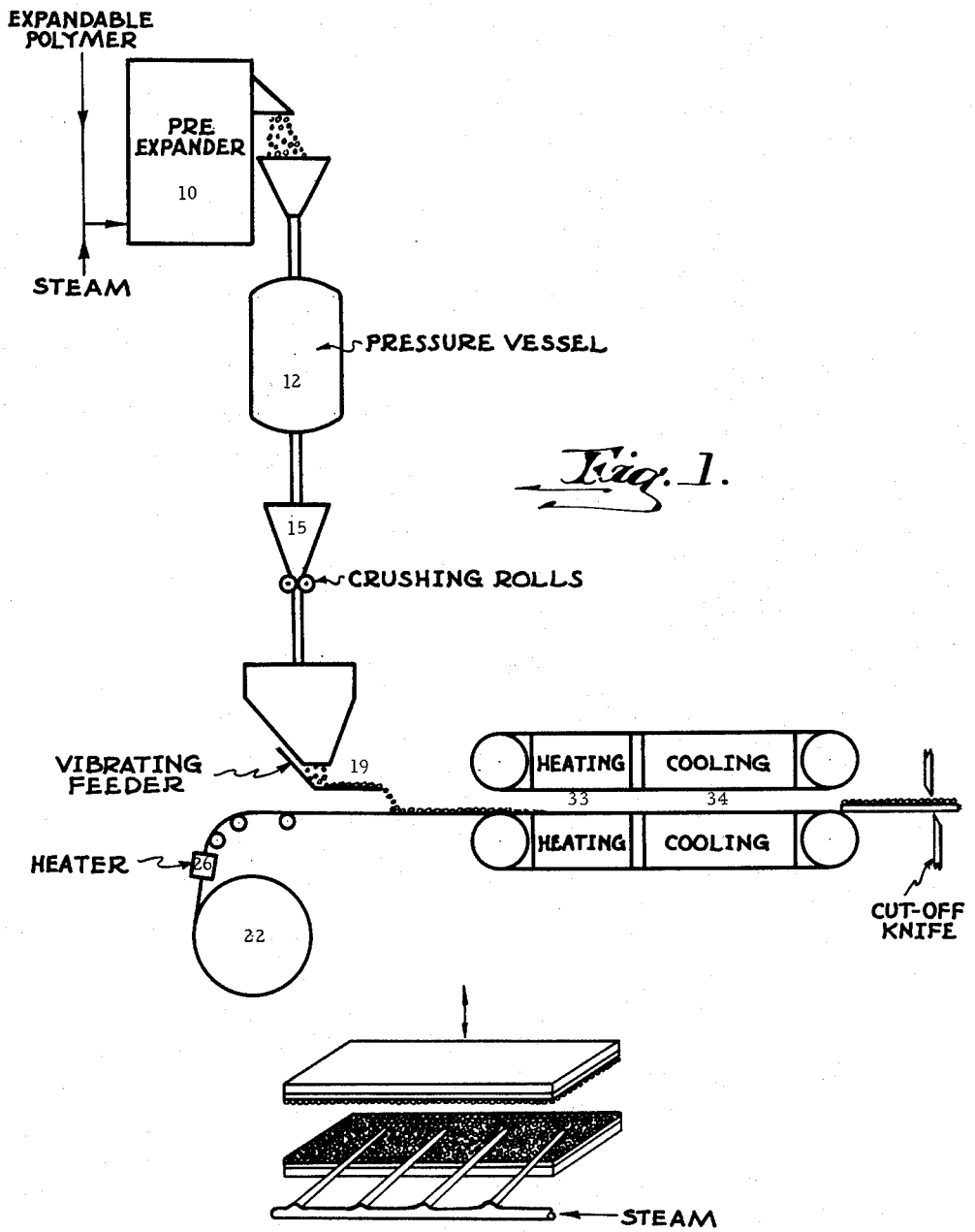

United States Patent Office 3,116,349
Patented Dec. 31, 1963

3,116,349
METHOD OF MOLDING FOAMED PLASTIC
SANDWICH PANEL
Richard H. Immel, Sewickley, Pa., assignor to Koppers
Company, Inc., a corporation of Delaware
Filed Dec. 19, 1961, Ser. No. 160,588
2 Claims. (Cl. 264—46)

This invention relates generally to the production of laminates and, more particularly, to molding a laminate comprised of a layer of dense material bonded to a layer of foamed styrene polymers.

Expandable styrene polymers for making foamed polymers are commercially available; for example, one expandable polystyrene is sold under the trademark "Dylite." Expandable styrene polymers generally contain from 3-30% of a volatile expanding agent (an aliphatic hydrocarbon, for example) which boils below the melting point of the styrene polymer. Foamed styrene polymers are readily produced by heating these expandable styrene polymers in a confining mold, whereupon the expandable styrene polymer particles expand and fuse together to form a self-sustaining structure of foamed styrene polymer.

Foamed styrene polymer is widely used to make articles such as novelties, toys, floats, insulation, etc. It is often of advantage, however, to bond the foamed styrene polymer structure to a dense facing material; then both materials can contribute to the properties of the final product. Thus, panels which are formed by securing plywood to the opposite faces of a foamed styrene core, thereby making a sandwich panel, can be used in the building of houses.

To form a laminate from a dense facing material and a foamed styrene polymer has heretofore involved the use of bonding adhesives. A difficulty has been that the adhesive generally contains a solvent which will dissolve the polystyrene. One process involves heating the layer of heat-activatable adhesive on the surface of the facing material to a temperature that evaporates the solvent and renders the adhesive tacky, and then pressing the tacky face (which is still hot) member against the surface of the foamed polystyrene layer. However, the foamed layer must be sufficiently thick to absorb the residual heat from the adhesive rapidly or the foamed layer will be melted.

This invention contemplates a novel and simple method of bonding a face member to a core of foamed styrene polymer without the use of an added adhesive.

In accordance with this invention, a continuous layer of expanded styrene polymer is adhered by heat to a dense facing material and, thereafter, expandable particles of styrene polymer are heated under confinement in conjunction with the layer, whereby these beads in situ expand and agglomerate with the layer adhering to the face member thereby forming a laminate of a dense face member and foamed styrene polymer.

The layer of expanded styrene polymer adhering to a dense face member is accomplished without the use of an additional adhesive by partially expanding an expandable styrene polymer, crushing the partially expanded polymer to approximately half its expanded volume and, thereafter, maintaining the crushed particles in contact with the surface of the facing material while subjecting the particles to heat, whereupon the particles expand, crush together, agglomerate and adhere to themselves and to the face material, thus forming a substantially continuous layer of expanded styrene polymer bonded to the dense face material. This intermediate product is then used as the facing material in an in situ foaming process to produce a laminate having a face of dense material and a core of foamed styrene polymer.

The in situ foaming of the expandable styrene polymer may be carried out in a conventional manner. Conveniently, the heating of the expandable styrene polymer may be accomplished in apparatus, for example, such as described in copending application Serial No. 742,855, now U.S. Patent No. 3,042,967, by the use of steam and such as described in U.S. Patent No. 2,998,501 by the use of a high frequency dielectric field.

As used herein, the term styrene polymer is intended to include homopolymers of styrene and copolymers of styrene that contain more than 50% and preferably more than 75 weight percent by weight of styrene. Examples of monomers that may be copolymerized with the styrene monomer include the conjugated 1,3-dienes, e.g., butadienes, isoprene, etc., alpha, beta-unsaturated monocarboxylic acids and derivatives thereof, e.g., acrylic acid, methyl acrylate, ethyl acrylate, butyl acrylate, 2-ethylhexyl acrylate and the corresponding esters of methacrylic acid, acrylamide, methacrylamide, acrylonitrile, methacrylonitrile, divinyl benzene, etc. Also included are blends of the styrene polymer with other polymers, such as blends of styrene polymer with rubbery diene polymers or the analogous compositions obtained by dissolving a rubbery diene polymer in styrene monomer and subsequently polymerizing the mixture, an example being "impact" polystyrene which is an admixture of polystyrene with an elastomer, such as for example a styrene-butadiene copolymer. All or a portion of the styrene may be replaced with its closely related homologues such as alpha-methylstyrene, o-, m-, and p-ethylstyrenes, o-, m-, and p-methylstyrenes, 2,4-dimethylstyrene.

The expanding agents incorporated in the styrene polymer are usually aliphatic hydrocarbons boiling within the range of about 10° C. to about 100° C. Typical expanding agents include, for example, pentane, hexane, heptane, cyclopentane, cyclopentadiene, and petroleum ethers that boil within the indicated range. Mixtures of two or more expanding agents are sometimes used. Usually 4 to 30 parts by weight of expanding agent is employed per 100 parts of styrene polymer.

The particles of expandable styrene polymer are usually spherical in shape and are generally known as "beads." These beads normally have a bulk density of about 38 pounds per cubic foot and are of a size such that they will pass through a U.S. Standard No. 12 sieve but be retained on a U.S. Standard No. 30 or 40 sieve dependent upon the grade of the bead. When subjected to heat in an unconfined state, the particles expand from 10–30 times their initial diameter. Using a pre-expander such as described in copending application Serial No. 689,195, now U.S. Patent No. 3,023,175, the degree of expansion can be controlled, for example, by the residence time of the beads in the pre-expanding apparatus. Since it is generally desired to have the foamed styrene polymer structure to have as low density as possible, it is of advantage, for example, to expand the beads to a bulk density of one pound per cubic foot.

The expanding agent, in expanding the beads to an extent of twenty to thirty times their original size and then condensing when the heat is removed, creates a partial vacuum in the beads. It is of advantage, therefore, to let the beads stand or "age" a sufficient length of time to permit the infiltration of air into the beads and overcome this partial vacuum.

So that the beads will bond to the dense material, it has been found necessary to crush the beads. While the extent of crushing is not particularly critical, it has been found desirable to crush the beads to about one half their volume. The reason for this increase in bonding action after the crushing of the beads is not clear; it may be that the crushing roughens the surface and closes microscopic pores that may exist in the surface walls, thereby enabling the polymer to grasp the surface of the dense material more effectively. The crushing may be carried out in any suitable manner. Conveniently, it is carried out by passing the particles between rollers.

In the practice of the invention, the beads are placed on the dense facing material in a substantially continuous layer. While it is not necessary that the beads be on a single layer of one discrete particle in thickness, it is of advantage to have the layer as thin as is possible so as to increase the effectiveness of heat transfer.

The beads are maintained in contact with the dense facing material by the application of pressure thereto. Again, this pressure is not critical. The pressure should be sufficient to maintain the beads under confinement and in contact with each other and with the dense material. Under the influence of heat, the expansion of the beads fills the spaces between the beads, and the beads unite with each other and the face material through the effect of the heat and pressure. The temperature to which the beads are subjected is not particularly critical, although it must be less than the melting point of the beads. Since polystyrene, for example, melts at about 330° F., the maximum desirable temperature, therefore, for this expandable polymer is between 275 and 300° F., and advantageously is lower, for example, about 220° F.

The invention will be illustrated further by reference to the drawing, wherein:

FIGURE 1 illustrates schematically apparatus for adhering a layer of beads to a dense material, FIGURE 2 illustrates schematically apparatus for producing a panel having hard dense faces and a core of foamed polymer, the machine being that described in U.S. Patent No. 3,042,967, and FIG. 3 illustrates a flow sheet of the steps of the invention.

The process in accordance with this invention for adhering a layer of expandable polystyrene to a sheet of aluminum is illustrated schematically in FIGURE 1. As illustrated, particles of expandable styrene polymer, "Dylite," are partially expanded or pre-expanded to a bulk density of about 1 pound per cubic foot in a pre-expander 10 by subjecting the expandable particles to an atmosphere of steam with agitation and without restraint. Under the influence of heat, the particles expand to about 30 times their initial volume and the lighter particles move upwardly to overflow from pre-expander 10. Conveniently, this pre-expansion is carried out in the apparatus described in U.S. Patent No. 3,023,175 to which reference is made for further details.

The overflowing pre-expanded particles from pre-expander 10 flow to a pressure vessel 12 where the beads are aged. In pressure vessel 12, the pre-expanded particles are subjected to a pressure of 10 pounds per square inch at a temperature of 150° F. for a period of seven minutes. This permits the vacuum normally created by the condensation of the expanding agent in the particles to be overcome and replaced by air.

The aged expandable particles then flow to the throat of a pair of crushing rollers 15 where the particles are crushed to about half their volume. The particles leaving the crushing rolls have a bulk density of about 2 pounds per cubic foot. These particles are fed by way of a conventional vibrating feeder onto a belt of aluminum.

The aluminum, which forms the dense facing material, feeds from roll 22 through heater 26 where it is heated to a temperature of about 200° F., then over idler rolls and beneath vibrating feeder 19 to receive the layer of expandable particles.

The aluminum with expandable polymer particles thereon passes through a heating zone 33 wherein the particles are heated indirectly by steam. As illustrated herein, the zone comprises a pair of continuously moving belts which carry the aluminum and particles through the heating zone 33 onto a cooling zone 34 where the particles and facing material are cooled. The resultant laminate of aluminum having a layer of expandable polystyrene particles adhering thereto passes to a cut-off knife where the sheets are sheared at desired intervals.

As illustrated herein, the resulting dense facing material is transported to a machine such as described in U.S. Patent No. 3,042,967. An in situ expansion and fusion of more expandable polystyrene that has been fed into the machine and which is to form the core of the laminated panel takes place. This machine is illustrated only schematically in FIGURE 2, reference being made to U.S. Patent No. 3,042,967 for further details of the apparatus. Briefly, a pre-expanded expandable polystyrene is fed by air into the machine between these sheets of aluminum, the layer of expandable polystyrene adhering to the aluminum facing the cavity within the machine. After the expandable polystyrene has been fed into the machine, the feeding is stopped and steam is injected within the cavity by way of steam probes. Under the influence of the heat provided by the steam, this expandable polystyrene expands further, adheres and fuses together along with the layer of expandable polystyrene which is bonded to the outer aluminum layers. The panel is then cooled and removed from the machine. In this manner, there is formed a sandwich panel having outer layers of dense material and an inner core of foamed polystyrene. The facing materials and the core are bonded together into an integral unit without the use of adhesives.

While the foregoing has described the use of aluminum as a dense facing material, other dense materials may be used such as, for example, wood, paper, fiberboard, asbestosboard, and so forth.

In accordance with this invention, permanent bands are established between a dense facing material and foamed styrene polymer without the use of additional adhesives. The panels are readily and conveniently produced without the danger of weak spots which might be caused by the dissolving of the foamed styrene polymer by solvents in the adhesive.

It is claimed:

1. A process for producing a laminate of dense material and foamed styrene polymer which comprises pre-expanding expandable styrene polymer particles, aging said particles, crushing said aged particles to half their volume forming a layer of said particles on said dense material as a face member, subjecting said particles to heat while maintaining pressurized contact thereof with said face member whereby said particles fuse together and bond to said face member to form a laminate of said dense material as a face member with a layer of foamed polystyrene adhering thereto, placing a pair of said laminates in spaced position with the layers of foamed polystyrene facing each other, filling the space between said members with pre-expanded expandable polystyrene particles, and heating said polystyrene particles whereby the expandable polystyrene particles expand, foam, and fuse together with said layers of foamed polystyrene to produce a sandwich panel having dense outer faces and a core of foamed polystyrene.

2. A process for producing a sandwich with faces of dense material and a core of foamed styrene polymer which comprises pre-expanding expandable styrene polymer particles to a bulk density of one pound per cubic foot, aging said particles at a temperature of 150° F. and a pressure of 10 pounds per square inch for seven minutes, crushing said aged particles to half their volume forming a layer of said particles one particle thick on said dense material, subjecting said particles to heat while maintaining pressurized contact thereof with said face member, whereby said particles fuse together and bond to said face member to form a laminate with said dense material as a face member and a layer of foamed polystyrene adhering thereto, placing a pair of said laminates in spaced position with the layers of foamed polystyrene facing each other, filling the space between said laminates with pre-expanded expandable polystyrene particles, and injecting steam into said space to heat said expandable polystyrene particles whereby the expandable polystyrene particles expand, foam, and fuse together with said layers of previously foamed polystyrene to produce sandwich panels having dense outer faces and a core of foamed polystyrene.

References Cited in the file of this patent

UNITED STATES PATENTS

| | | |
|---|---|---|
| 2,986,537 | Chaumeton | May 30, 1961 |
| 3,037,897 | Pelley | June 5, 1962 |